(12) United States Patent
Zhang et al.

(10) Patent No.: US 12,087,060 B2
(45) Date of Patent: Sep. 10, 2024

(54) VEHICULAR VISION SYSTEM WITH OBJECT CLASSIFICATION

(71) Applicant: Magna Electronics Inc., Auburn Hills, MI (US)

(72) Inventors: Liang Zhang, Ottawa (CA); Tao-I Hsu, Oakville (CA)

(73) Assignee: Magna Electronics Inc., Auburn Hills, MI (US)

( * ) Notice: Subject to any disclaimer, the term of this patent is extended or adjusted under 35 U.S.C. 154(b) by 415 days.

(21) Appl. No.: 17/449,326

(22) Filed: Sep. 29, 2021

(65) Prior Publication Data

US 2022/0101024 A1    Mar. 31, 2022

Related U.S. Application Data

(60) Provisional application No. 63/198,130, filed on Sep. 30, 2020.

(51) Int. Cl.
| | |
|---|---|
| *G06K 9/00* | (2022.01) |
| *B60W 50/14* | (2020.01) |
| *G06F 18/24* | (2023.01) |
| *G06V 10/75* | (2022.01) |
| *G06V 20/58* | (2022.01) |

(52) U.S. Cl.
CPC ............ *G06V 20/58* (2022.01); *B60W 50/14* (2013.01); *G06F 18/24* (2023.01); *G06V 10/758* (2022.01); *B60W 2050/143* (2013.01); *B60W 2420/403* (2013.01); *B60W 2554/4029* (2020.02)

(58) Field of Classification Search
CPC ............................. G06V 10/50; G06V 10/467
See application file for complete search history.

(56) References Cited

U.S. PATENT DOCUMENTS

| 5,550,677 A | 8/1996 | Schofield et al. |
| 5,670,935 A | 9/1997 | Schofield et al. |

(Continued)

OTHER PUBLICATIONS

Hassaballah, M., Mourad A. Kenk, and Ibrahim M. El-Henawy. "Local binary pattern-based on-road vehicle detection in urban traffic scene." Pattern Analysis and Applications 23.4 (Feb. 2020): 1505-1521. (Year: 2020).*

(Continued)

*Primary Examiner* — Gregory A Morse
*Assistant Examiner* — Owais Iqbal Memon
(74) *Attorney, Agent, or Firm* — HONIGMAN LLP

(57) ABSTRACT

A vehicular vision system includes a camera disposed at a vehicle and capturing image data. The system, via processing at an electronic control unit (ECU) of image data captured by the camera, detects an object at a first orientation relative to camera. A first local binary pattern represents in binary form a first portion of the image data that includes the detected object. The system detects the object at a second orientation relative to camera. A second local binary pattern represents in binary form a second portion of the image data that includes the detected object. The second orientation is different from the first orientation and the second local binary pattern is different than the first local binary pattern. The system groups the first and second local binary patterns into a common histogram bin. The system classifies the detected object based at least in part on the common histogram bin.

21 Claims, 49 Drawing Sheets

(56) References Cited

U.S. PATENT DOCUMENTS

| | | | |
|---|---|---|---|
| 5,949,331 | A | 9/1999 | Schofield et al. |
| 7,038,577 | B2 | 5/2006 | Pawlicki et al. |
| 7,720,580 | B2 | 5/2010 | Higgins-Luthman |
| 7,855,755 | B2 | 12/2010 | Weller et al. |
| 8,581,983 | B2 | 11/2013 | Shi et al. |
| 9,619,716 | B2 | 4/2017 | Pflug |
| 10,071,687 | B2 | 9/2018 | Ihlenburg et al. |
| 10,099,614 | B2 | 10/2018 | Diessner |
| 10,677,894 | B2 | 6/2020 | Wodrich et al. |
| 10,883,846 | B2 | 1/2021 | Seifert |
| 11,175,516 | B1* | 11/2021 | Canberk ............... G06V 10/40 |
| 2013/0142426 | A1* | 6/2013 | Kaneda ............... G06V 40/171 |
| | | | 382/165 |
| 2014/0193071 | A1* | 7/2014 | Cho ............... G06V 10/50 |
| | | | 382/170 |
| 2018/0307911 | A1* | 10/2018 | Zohourian ............... G06T 7/11 |
| 2021/0035273 | A1* | 2/2021 | Deng ............... G06T 5/92 |
| 2021/0216752 | A1* | 7/2021 | Trani ............... G06V 40/165 |

OTHER PUBLICATIONS

Karis, Mohd Safirin, et al. "Local Binary Pattern (LBP) with application to variant object detection: A survey and method." 2016 IEEE 12th International Colloquium on Signal Processing & its Applications (CSPA). IEEE, 2016. (Year: 2016).*

Xu, Xue-mei, et al. "Vehicle detection algorithm based on codebook and local binary patterns algorithms." Journal of Central South University 22.2 (2015): 593-600. (Year: 2015).*

* cited by examiner

| Bin 1 | | |
|---|---|---|
| Binary | Decimal | 1-0 or 0-1 Transitions |
| 00000000 | 0 | 0 |

FIG. 8A

| Bin 2 | | |
|---|---|---|
| Binary | Decimal | 1-0 or 0-1 Transitions |
| 11111111 | 255 | 0 |

FIG. 8B

| Bin 3 | | |
|---|---|---|
| Binary | Decimal | 1-0 or 0-1 Transitions |
| 00000001 | 1 | 1 |
| 00000010 | 2 | 2 |
| 00000100 | 4 | 2 |
| 00001000 | 8 | 2 |
| 00010000 | 16 | 2 |
| 00100000 | 32 | 2 |
| 01000000 | 64 | 2 |
| 10000000 | 128 | 1 |

FIG. 8C

| Bin 4 | | |
|---|---|---|
| Binary | Decimal | 1-0 or 0-1 Transitions |
| 00000011 | 3 | 1 |
| 00000110 | 6 | 2 |
| 00001100 | 12 | 2 |
| 00011000 | 24 | 2 |
| 00110000 | 48 | 2 |
| 01100000 | 96 | 2 |
| 11000000 | 192 | 1 |
| 10000001 | 129 | 2 |

FIG. 8D

| | Bin 5 | |
|---|---|---|
| Binary | Decimal | 1-0 or 0-1 Transitions |
| 00000111 | 7 | 1 |
| 00001110 | 14 | 2 |
| 00011100 | 28 | 2 |
| 00111000 | 56 | 2 |
| 01110000 | 112 | 2 |
| 11100000 | 224 | 1 |
| 11000001 | 193 | 2 |
| 10000011 | 131 | 2 |

FIG. 8E

| Bin 6 | | |
|---|---|---|
| Binary | Decimal | 1-0 or 0-1 Transitions |
| 00001111 | 15 | 1 |
| 00011110 | 30 | 2 |
| 00111100 | 60 | 2 |
| 01111000 | 120 | 2 |
| 11110000 | 240 | 1 |
| 11100001 | 225 | 2 |
| 11000011 | 195 | 2 |
| 10000111 | 135 | 2 |

FIG. 8F

| Bin 7 | | |
|---|---|---|
| Binary | Decimal | 1-0 or 0-1 Transitions |
| 00011111 | 31 | 1 |
| 00111110 | 62 | 2 |
| 01111100 | 124 | 2 |
| 11111000 | 248 | 1 |
| 11110001 | 241 | 2 |
| 11100011 | 227 | 2 |
| 11000111 | 199 | 2 |
| 10001111 | 143 | 2 |

FIG. 8G

| Bin 8 | | |
|---|---|---|
| Binary | Decimal | 1-0 or 0-1 Transitions |
| 00111111 | 63 | 1 |
| 01111110 | 126 | 2 |
| 11111100 | 252 | 1 |
| 11111001 | 249 | 2 |
| 11110011 | 243 | 2 |
| 11100111 | 231 | 2 |
| 11001111 | 207 | 2 |
| 10011111 | 159 | 2 |

FIG. 8H

| Bin 9 | | |
|---|---|---|
| Binary | Decimal | 1-0 or 0-1 Transitions |
| 01111111 | 127 | 1 |
| 11111110 | 254 | 1 |
| 11111101 | 253 | 2 |
| 11111011 | 251 | 2 |
| 11110111 | 247 | 2 |
| 11101111 | 239 | 2 |
| 11011111 | 223 | 2 |
| 10111111 | 191 | 2 |

FIG. 8I

| Bin 11 | | |
|---|---|---|
| Binary | Decimal | 1-0 or 0-1 Transitions |
| 00110011 | 51 | 3 |
| 01100110 | 102 | 4 |
| 11001100 | 204 | 3 |
| 10011001 | 153 | 4 |

FIG. 9B

| Bin 10 | | |
|---|---|---|
| Binary | Decimal | 1-0 or 0-1 Transitions |
| 00010001 | 17 | 3 |
| 00100010 | 34 | 4 |
| 01000100 | 68 | 4 |
| 10001000 | 136 | 3 |

FIG. 9A

| Bin 12 | | |
|---|---|---|
| Binary | Decimal | 1-0 or 0-1 Transitions |
| 01110111 | 119 | 3 |
| 11101110 | 238 | 3 |
| 11011101 | 221 | 4 |
| 10111011 | 187 | 4 |

FIG. 9C

| Bin 13 | | |
|---|---|---|
| Binary | Decimal | 1-0 or 0-1 Transitions |
| 0000101 | 5 | 3 |
| 0001010 | 10 | 4 |
| 0010100 | 20 | 4 |
| 0101000 | 40 | 4 |
| 1010000 | 80 | 4 |
| 1010000 | 160 | 3 |
| 0100001 | 65 | 3 |
| 1000010 | 130 | 3 |

FIG. 10A

| Bin 14 | | |
|---|---|---|
| Binary | Decimal | 1-0 or 0-1 Transitions |
| 00001001 | 9 | 3 |
| 00010010 | 18 | 4 |
| 00100100 | 36 | 4 |
| 01001000 | 72 | 4 |
| 10010000 | 144 | 3 |
| 00100001 | 33 | 3 |
| 01000010 | 66 | 4 |
| 10000100 | 132 | 3 |

FIG. 10B

| Bin 15 | | |
|---|---|---|
| Binary | Decimal | 1-0 or 0-1 Transitions |
| 00001011 | 11 | 3 |
| 00010110 | 22 | 4 |
| 00101100 | 44 | 4 |
| 01011000 | 88 | 4 |
| 10110000 | 176 | 3 |
| 01100001 | 97 | 3 |
| 11000010 | 194 | 3 |
| 10000101 | 133 | 4 |

FIG. 10C

| Bin 16 | | |
|---|---|---|
| Binary | Decimal | 1-0 or 0-1 Transitions |
| 00001101 | 13 | 3 |
| 00011010 | 26 | 4 |
| 00110100 | 52 | 4 |
| 01101000 | 104 | 4 |
| 11010000 | 208 | 3 |
| 10100001 | 161 | 4 |
| 01000011 | 67 | 3 |
| 10000110 | 134 | 3 |

FIG. 10D

| Bin 17 | | |
|---|---|---|
| Binary | Decimal | 1-0 or 0-1 Transitions |
| 00010011 | 19 | 3 |
| 00100110 | 38 | 4 |
| 01001100 | 76 | 4 |
| 10011000 | 152 | 3 |
| 00110001 | 49 | 3 |
| 01100010 | 98 | 4 |
| 11000100 | 196 | 3 |
| 10001001 | 137 | 4 |

FIG. 10E

| Bin 18 | | |
|---|---|---|
| Binary | Decimal | 1-0 or 0-1 Transitions |
| 00010111 | 23 | 3 |
| 00101110 | 46 | 4 |
| 01011100 | 92 | 4 |
| 10111000 | 184 | 3 |
| 01110001 | 113 | 3 |
| 11100010 | 226 | 3 |
| 11000101 | 197 | 4 |
| 10001011 | 139 | 4 |

FIG. 10F

| Bin 19 | | |
|---|---|---|
| Binary | Decimal | 1-0 or 0-1 Transitions |
| 00011001 | 25 | 3 |
| 00110010 | 50 | 4 |
| 01100100 | 100 | 4 |
| 11001000 | 200 | 3 |
| 10010001 | 145 | 4 |
| 00100011 | 35 | 3 |
| 01000110 | 70 | 4 |
| 10001100 | 140 | 3 |

FIG. 10G

| Bin 20 | | |
|---|---|---|
| Binary | Decimal | 1-0 or 0-1 Transitions |
| 00011011 | 27 | 3 |
| 00110110 | 54 | 4 |
| 01101100 | 108 | 4 |
| 11011000 | 216 | 3 |
| 10110001 | 177 | 4 |
| 01100011 | 99 | 3 |
| 11000110 | 198 | 3 |
| 10001101 | 141 | 4 |

FIG. 10H

| Bin 21 | | |
|---|---|---|
| Binary | Decimal | 1-0 or 0-1 Transitions |
| 00011101 | 29 | 3 |
| 00111010 | 58 | 4 |
| 01110100 | 116 | 4 |
| 11101000 | 232 | 3 |
| 11010001 | 209 | 4 |
| 10100011 | 163 | 4 |
| 01000111 | 71 | 3 |
| 10001110 | 142 | 3 |

FIG. 10I

| Bin 22 | | |
|---|---|---|
| Binary | Decimal | 1-0 or 0-1 Transitions |
| 00100111 | 39 | 3 |
| 01001110 | 78 | 4 |
| 10011100 | 156 | 3 |
| 00111001 | 57 | 3 |
| 01110010 | 114 | 4 |
| 11100100 | 228 | 3 |
| 11001001 | 201 | 4 |
| 10010011 | 147 | 4 |

FIG. 10J

| Bin 23 | | |
|---|---|---|
| Binary | Decimal | 1-0 or 0-1 Transitions |
| 00101111 | 47 | 3 |
| 01011110 | 94 | 4 |
| 10111100 | 188 | 3 |
| 01111001 | 121 | 3 |
| 11110010 | 242 | 3 |
| 11100101 | 229 | 4 |
| 11001011 | 203 | 4 |
| 10010111 | 151 | 4 |

FIG. 10K

| Bin 24 | | |
|---|---|---|
| Binary | Decimal | 1-0 or 0-1 Transitions |
| 00110111 | 55 | 3 |
| 01101110 | 110 | 4 |
| 11011100 | 220 | 3 |
| 10111001 | 185 | 4 |
| 01110011 | 115 | 3 |
| 11100110 | 230 | 3 |
| 11001101 | 205 | 4 |
| 10011011 | 155 | 4 |

FIG. 10L

| Bin 25 | | |
|---|---|---|
| Binary | Decimal | 1-0 or 0-1 Transitions |
| 00111011 | 59 | 3 |
| 01110110 | 118 | 4 |
| 11101100 | 236 | 3 |
| 11011001 | 217 | 4 |
| 10110011 | 179 | 4 |
| 01100111 | 103 | 3 |
| 11001110 | 206 | 3 |
| 10011101 | 157 | 4 |

FIG. 10M

| Bin 26 | | |
|---|---|---|
| Binary | Decimal | 1-0 or 0-1 Transitions |
| 00111101 | 61 | 3 |
| 01111010 | 122 | 4 |
| 11110100 | 244 | 3 |
| 11101001 | 233 | 4 |
| 11010011 | 211 | 4 |
| 10100111 | 167 | 4 |
| 01001111 | 79 | 3 |
| 10011110 | 158 | 3 |

FIG. 10N

| Bin 27 | | |
|---|---|---|
| Binary | Decimal | 1-0 or 0-1 Transitions |
| 01011111 | 95 | 3 |
| 10111110 | 190 | 3 |
| 01111101 | 125 | 3 |
| 11111010 | 250 | 3 |
| 11110101 | 245 | 4 |
| 11101011 | 235 | 4 |
| 11010111 | 215 | 4 |
| 10101111 | 175 | 4 |

FIG. 10O

| Bin 28 | | |
|---|---|---|
| Binary | Decimal | 1-0 or 0-1 Transitions |
| 01101111 | 111 | 3 |
| 11011110 | 222 | 3 |
| 10111101 | 189 | 4 |
| 01111011 | 123 | 3 |
| 11110110 | 246 | 3 |
| 11101101 | 237 | 4 |
| 11011011 | 219 | 4 |
| 10110111 | 183 | 4 |

FIG. 10P

| Bin 29 | | |
|---|---|---|
| Binary | Decimal | 1-0 or 0-1 Transitions |
| 00010101 | 21 | 5 |
| 00101010 | 42 | 6 |
| 01010100 | 84 | 6 |
| 10101000 | 168 | 5 |
| 01010001 | 81 | 5 |
| 10100010 | 162 | 5 |
| 01000101 | 69 | 5 |
| 10001010 | 138 | 5 |

FIG. 11A

| Bin 30 | | |
|---|---|---|
| Binary | Decimal | 1-0 or 0-1 Transitions |
| 0010 0101 | 37 | 5 |
| 0100 1010 | 74 | 6 |
| 1001 0100 | 148 | 5 |
| 0010 1001 | 41 | 5 |
| 0101 0010 | 82 | 6 |
| 1010 0100 | 164 | 5 |
| 0100 1001 | 73 | 5 |
| 1001 0010 | 146 | 5 |

FIG. 11B

| Bin 31 | | |
|---|---|---|
| Binary | Decimal | 1-0 or 0-1 Transitions |
| 00101011 | 43 | 5 |
| 01010110 | 86 | 6 |
| 10101100 | 172 | 5 |
| 01011001 | 89 | 5 |
| 10110010 | 178 | 5 |
| 01100101 | 101 | 5 |
| 11001010 | 202 | 5 |
| 10010101 | 149 | 6 |

FIG. 11C

| Bin 32 | | |
|---|---|---|
| Binary | Decimal | 1-0 or 0-1 Transitions |
| 00101101 | 45 | 5 |
| 01011010 | 90 | 6 |
| 10110100 | 180 | 5 |
| 01101001 | 105 | 5 |
| 11010010 | 210 | 5 |
| 10100101 | 165 | 6 |
| 01001011 | 75 | 5 |
| 10010110 | 150 | 5 |

FIG. 11D

| Bin 33 | | |
|---|---|---|
| Binary | Decimal | 1-0 or 0-1 Transitions |
| 00110101 | 53 | 5 |
| 01101010 | 106 | 6 |
| 11010100 | 212 | 5 |
| 10101001 | 169 | 6 |
| 01010011 | 83 | 5 |
| 10100110 | 166 | 5 |
| 01001101 | 77 | 5 |
| 10011010 | 154 | 5 |

FIG. 11E

| Bin 34 | | |
|---|---|---|
| Binary | Decimal | 1-0 or 0-1 Transitions |
| 01010111 | 87 | 5 |
| 10101110 | 174 | 5 |
| 01011101 | 93 | 5 |
| 10111010 | 186 | 5 |
| 01110101 | 117 | 5 |
| 11101010 | 234 | 5 |
| 11010101 | 213 | 6 |
| 10101011 | 171 | 6 |

FIG. 11F

| Bin 35 | | |
|---|---|---|
| Binary | Decimal | 1-0 or 0-1 Transitions |
| 01011011 | 91 | 5 |
| 10110110 | 182 | 5 |
| 01101101 | 109 | 5 |
| 11011010 | 218 | 5 |
| 10110101 | 181 | 6 |
| 01101011 | 107 | 5 |
| 11010110 | 214 | 5 |
| 10101101 | 173 | 6 |

FIG. 11G

| Bin 36 | | |
|---|---|---|
| Binary | Decimal | 1-0 or 0-1 Transitions |
| 01010101 | 85 | 7 |
| 10101010 | 170 | 7 |

FIG. 12

VEHICULAR VISION SYSTEM WITH OBJECT CLASSIFICATION

CROSS REFERENCE TO RELATED APPLICATION

The present application claims the filing benefits of U.S. provisional application Ser. No. 63/198,130, filed Sep. 30, 2020, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

Implementations herein provide a vehicular vision system that includes a camera disposed at a vehicle equipped with the vehicular vision system and viewing exterior of the vehicle. The camera captures image data. The camera includes a CMOS imaging array and the CMOS imaging array includes at least one million photosensors arranged in rows and columns. An electronic control unit (ECU) includes electronic circuitry and associated software. The electronic circuitry of the ECU includes an image processor for processing image data captured by the camera to detect presence of objects viewed by the camera. The vehicular vision system, via processing at the ECU of image data captured by the camera, detects an object at a first orientation relative to camera. A first local binary pattern represents in binary form a first portion of the image data that includes the detected object. The vehicular vision system, via processing at the ECU of image data captured by the camera, detects the object at a second orientation relative to camera. A second local binary pattern represents in binary form a second portion of the image data that includes the detected object. The second orientation is different from the first orientation and the second local binary pattern is different than the first local binary pattern. The vehicular vision system groups the first and second local binary patterns into a common histogram bin and classifies the detected object based at least in part on the common histogram bin.

These and other objects, advantages, purposes and features of the present invention will become apparent upon review of the following specification in conjunction with the drawings.

BRIEF DESCRIPTION OF THE DRAWINGS

FIGS. 8A-8I are schematic views of uniform bins with at most two transitions;

FIGS. 9A-9C are schematic views of three symmetrical feature bins with at least three and at most four transitions;

FIGS. 10A-10P are schematic views of variable bins with at least three and at most four transitions;

FIGS. 11A-11G are schematic views of fluctuating bins with at least five and at most six transitions; and FIG. 12 is a schematic view of a wave bin with seven transitions.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
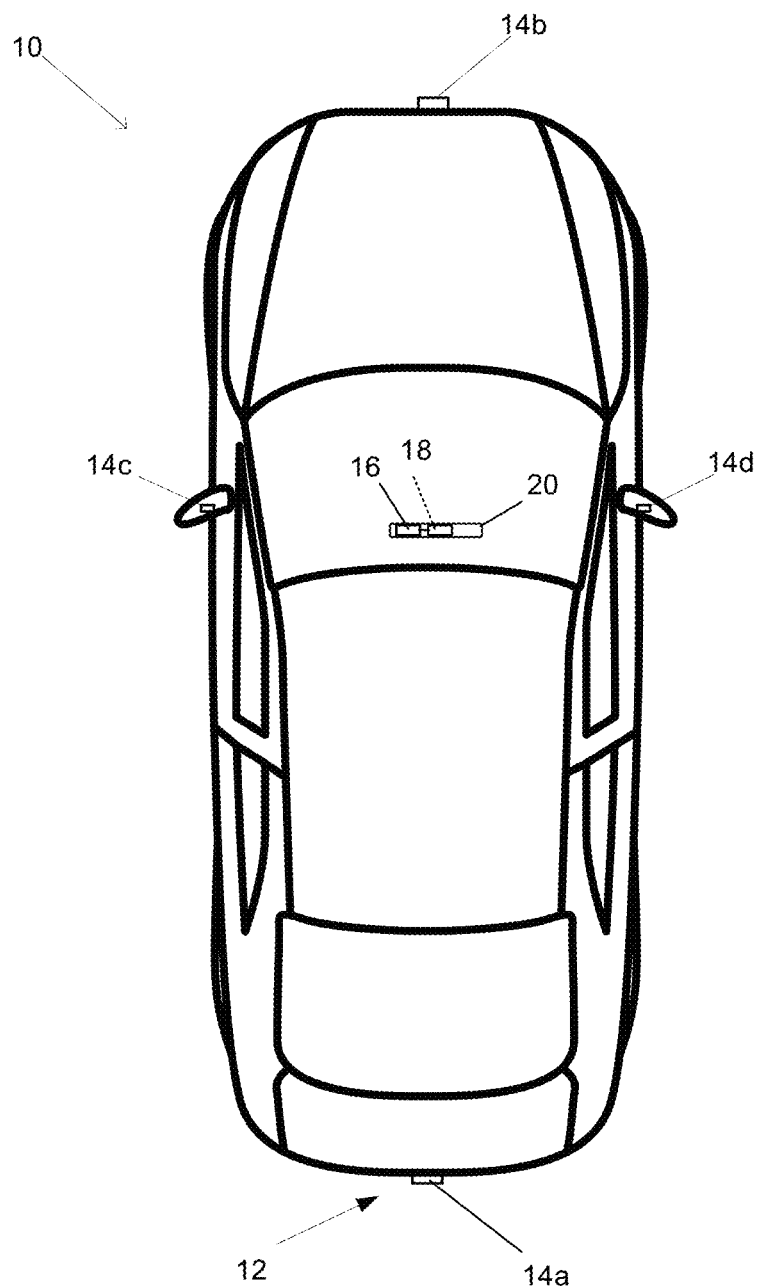
FIG. 1 is a plan view of a vehicle with a vision system that incorporates cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
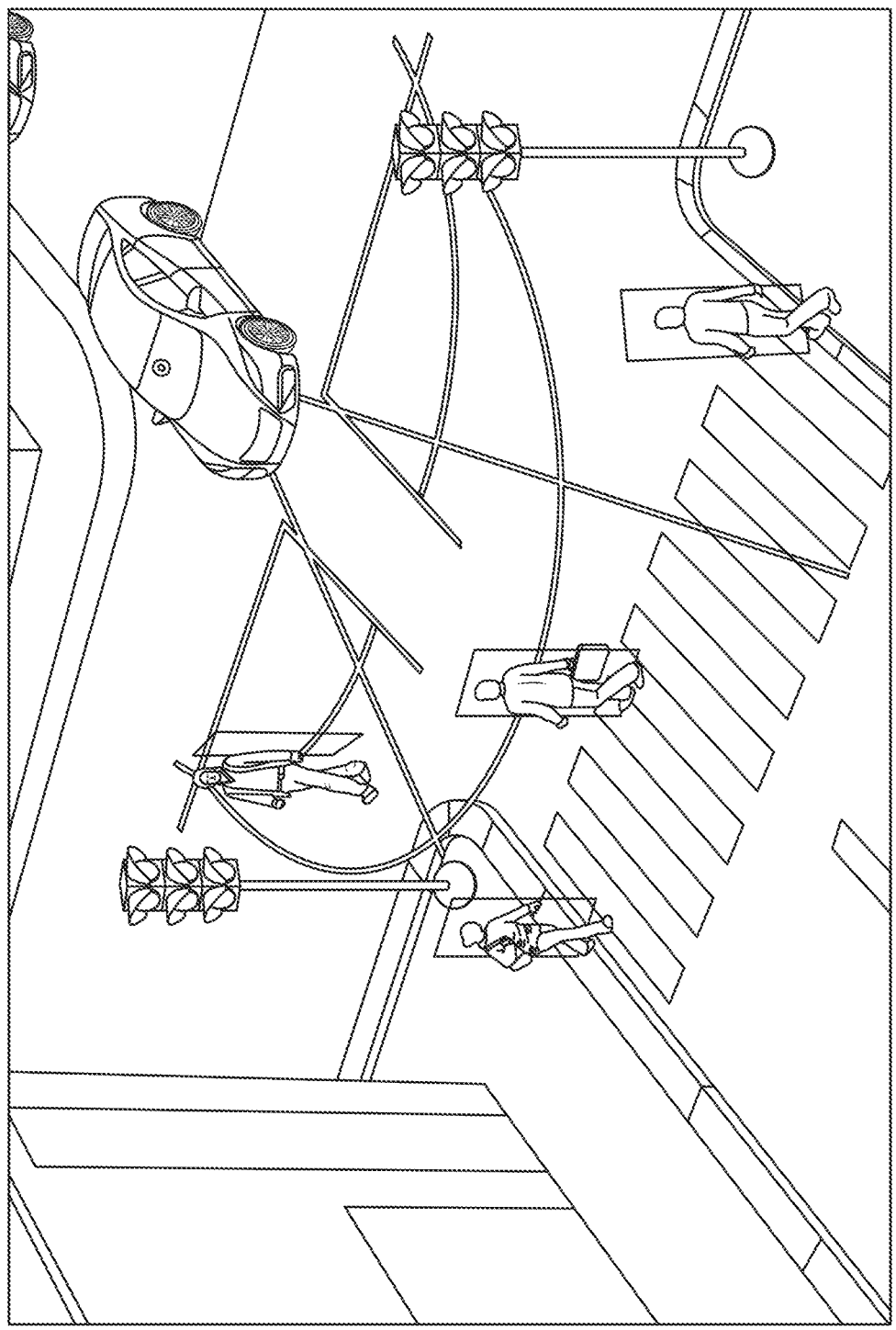
FIG. 2 is a perspective view of a vehicle performing object classification of a scene.
Figure 3:
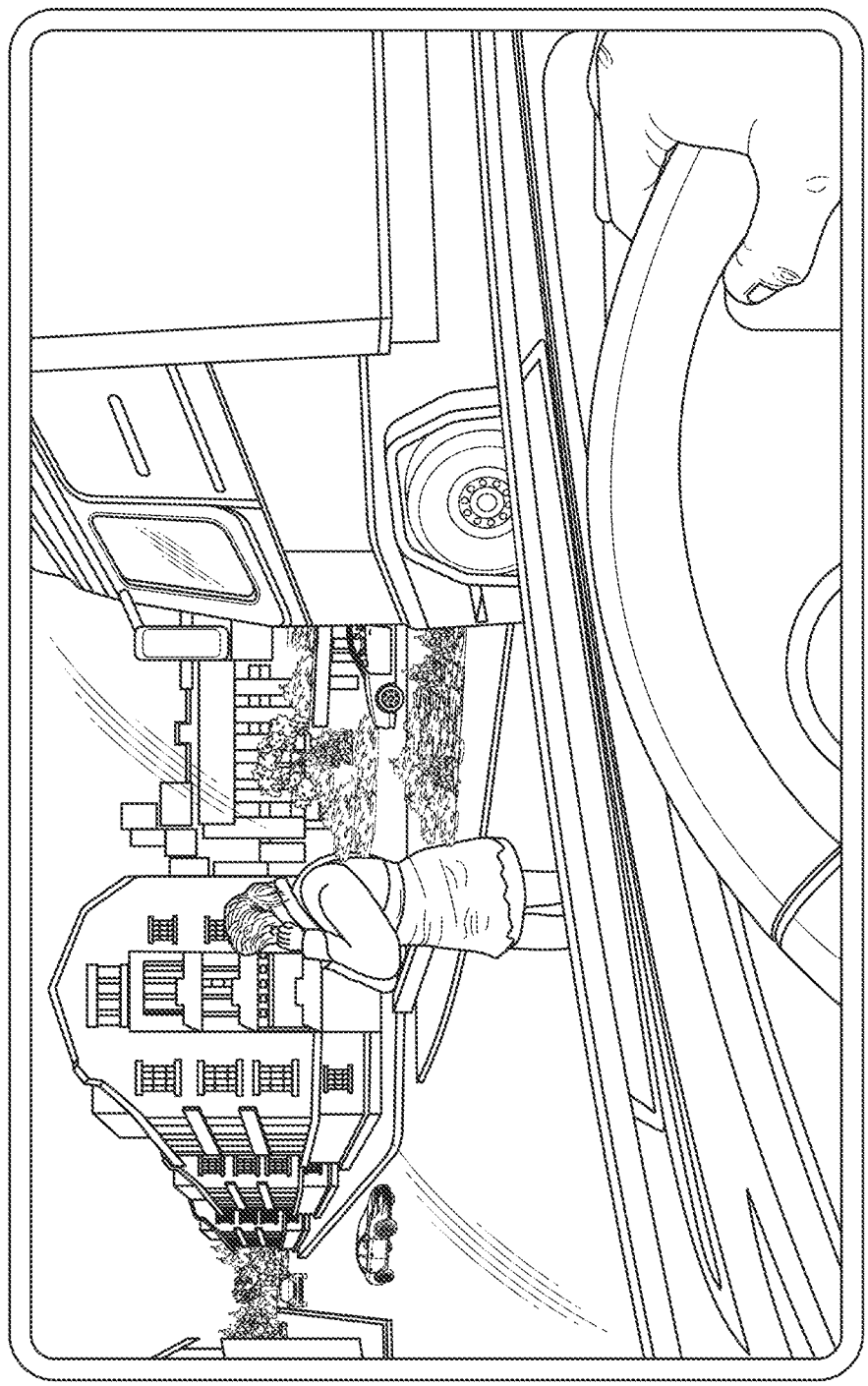
FIG. 3 is a perspective view of a pedestrian crossing in front of a vehicle.
Figure 4A:
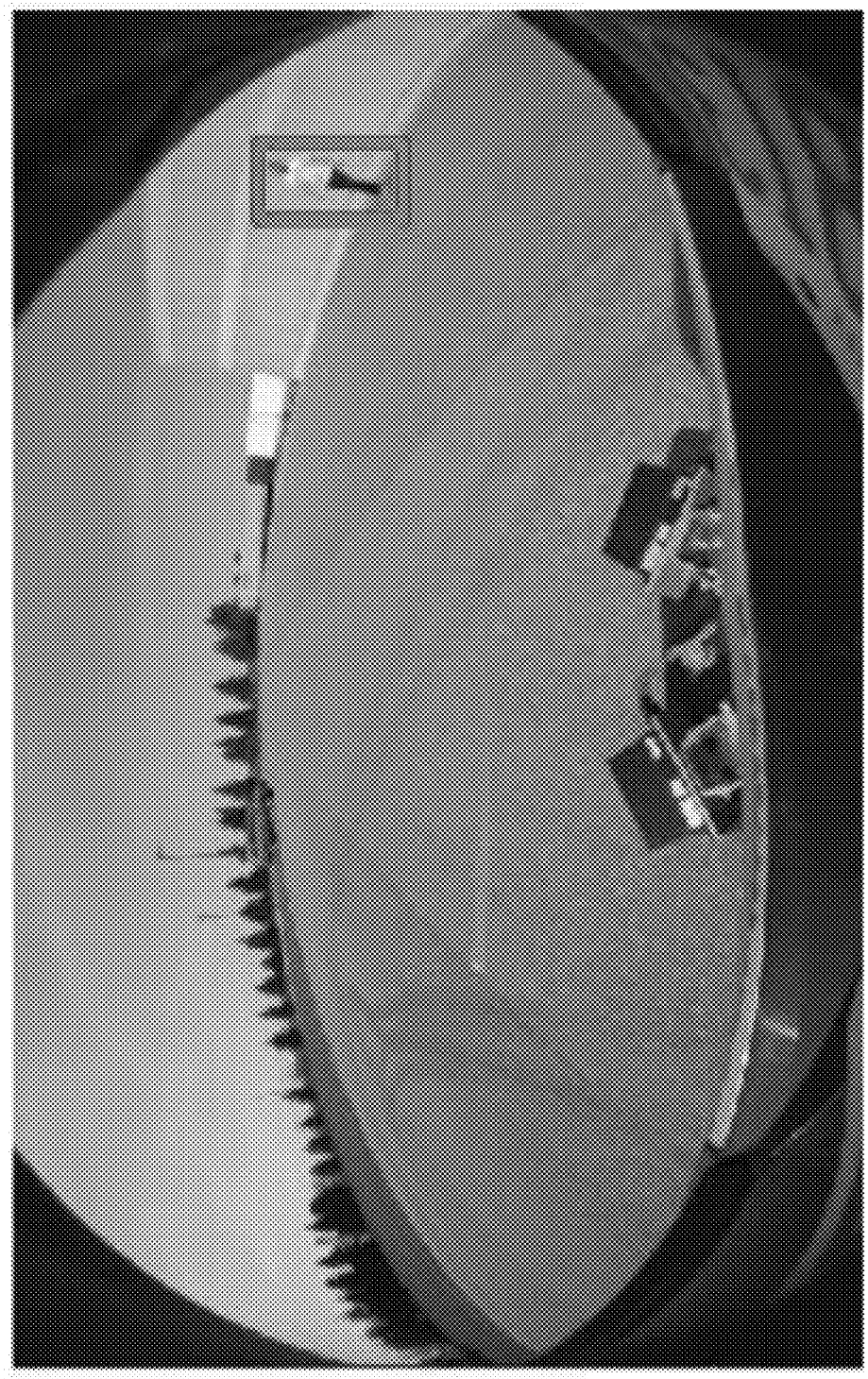
FIGS. 4A-4F are perspective views of the same pedestrian with different size, form, and orientation in frames of image data captured by a camera with a fisheye lens.
Figure 4B:
Figure 4C:
Figure 4D:
Figure 4E:
Figure 4F:

In today's vehicles, surround awareness and driver assistance is a key marketable feature. For example, object detection and classification using one or more fisheye lens cameras (i.e., wide or ultra wide field of view cameras) is common. Referring to FIGS. 2 and 3, object classification of a scene includes adding values to existing detection-based algorithms (e.g., pedestrian detection, vehicle detection, blind spot detection, automatic parking spot detection, etc.).

Typically, object classification is a training-and-testing process based on an object model. The process defines how effectively the object model represents the objects and how the object model differentiates itself from other objects. Modern techniques for object classification include support vector machines, extreme machine learning, and advanced deep learning technologies.

Figure 5A:
FIGS. 5A-5C are perspective views of the same vehicle with different size, form, and orientation in frames of image data captured by a camera with a fisheye lens.
Figure 5B:
Figure 5C:

Referring now to FIGS. 4A-4F, vehicle vision systems and other driver assistance systems are increasingly using fisheye optics. However, because of distortion caused by fisheye optics (i.e., warping), features typically cannot be measured accurately in image data captured by fisheye lenses, as this may lead to a loss in accuracy of object representation or classification. The fisheye lens may also create classification performance issues due to variations in possible object representation. These problems are further compounded by the fact that objects can vary not only in size and form, but also in orientation. FIGS. 4A-4F illustrate examples of the same pedestrian varying in size, form, and orientation in frames of image data captured by a camera equipped with a fisheye lens as the pedestrian walks across the field of view of the camera. Similarly, FIGS. 5A-5C illustrate examples of the same vehicle varying in size, shape, and orientation in frames of image data captured by a camera equipped with a fisheye lens as the vehicle travels through the field of view of the camera.

Performance of a learning based object detection system is dependent upon both the learning algorithm and feature representation (e.g., what features or independent variables the model is trained on). The object model consists of a plurality of features (i.e., sets of features) that are extracted from an image patch or segment surrounding a target object in image data captured by the camera. A set of such features (i.e., a feature descriptor) contains interesting and meaningful local information to distinguish the set of features from other features. Due to the variation of object size, object form, and object orientation of objects detected within the captured image data, rotation and size invariant features (i.e., features that do not change based on the object's size, form, and orientation relative to the camera) are desired to build a descriptor for an object classification model. A feature descriptor presents a local texture property of an image (i.e., target object) surrounding a single point or small region. Some examples of object descriptors include scale-invariant feature transform (SIFT), binary robust invariant scalable keypoints (BRISK), speeded-up robust features (SURF), histograms of oriented gradients, and uniform local binary patterns (ULBP).

Figure 6:
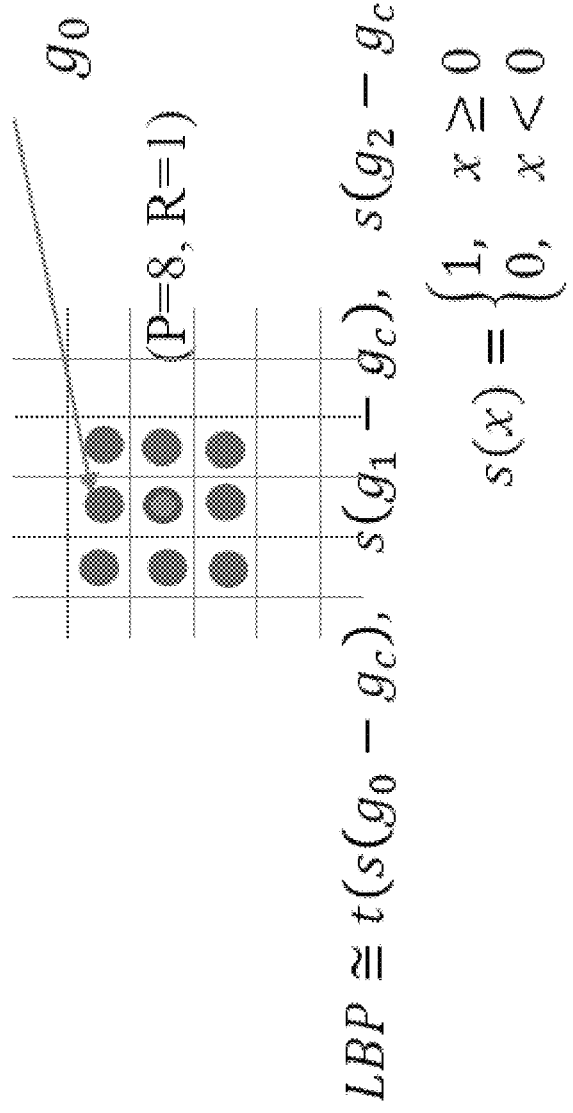
FIG. 6 is a schematic view of a local binary pattern.

Referring now to FIG. 6, local binary patterns (LBP) have attracted significant research due to good performance and low computation complexity for feature extraction. Local binary patterns are a type of visual descriptor used for classification in computer vision. FIG. 6 illustrates the definition of a local binary pattern where P is defined as the number of total pixels surrounding a center pixel $g_c$ with a distance of R pixels. In the illustrated example of FIG. 6, P is 8 and R is 1. As a specific example of LBP, 0b0010000 indicates that only the luminance value at the pixel $g_2$ is larger or equal to the value at its center pixel $g_c$. The LBP histogram has a separate bin for every pattern. In the case of P=8, there is a total of 256 patterns (i.e., bins). The length of the feature vector (LBP histogram) for a single cell is 256. The length of the feature vector may be reduced to decrease computation complexity and increase statistics provided by a given set of training data.

An LBP pattern is considered uniform (i.e., a uniform LBP) when the binary pattern contains at most two "0-1" or "1-0" transitions (i.e., a binary '0' followed by a binary '1' or a binary '1' followed by a binary '0'). For example, the binary pattern 0b00001000 includes two transitions (one 0-1 transition and one 1-0 transition) and is therefore a uniform pattern. However, the binary pattern 0b00101010 has six transitions and therefore is not a uniform pattern (as the six transitions exceeds the maximum allowed two). In computations of uniform LBP histograms, the histogram has a separate bin for every uniform pattern and all non-uniform patterns are assigned to a single bin. Therefore, the length of the feature vector for a single cell reduces from 256 to 59. The first 58 uniform binary patterns (or bins) correspond to the integers 0, 1, 2, 3, 4, 6, 7, 8, 12, 14, 15, 16, 24, 28, 30, 31, 32, 48, 56, 60, 62, 63, 64, 96, 112, 120, 124, 126, 127, 128, 129, 131, 135, 143, 159, 191, 192, 193, 195, 199, 207, 223, 224, 225, 227, 231, 239, 240, 241, 243, 247, 248, 249, 251, 252, 253, 254 and 255.

In an example, a LBP is a 1-D signal with the number of 1-0 and 0-1 transitions presenting the frequencies of the signal. Thus defined, one uniform LBP (ULBP) has at most 2 "1-0" and/or "0-1" transitions, and therefore the signal primarily has low frequency components. From this point of view, it is understandable that captured images mainly contain the low frequency components and therefore will be well represented by ULBP. High frequency distribution of the signal provides the ability to differentiate itself from other objects when they have the similar low frequency components.

Figure 7:
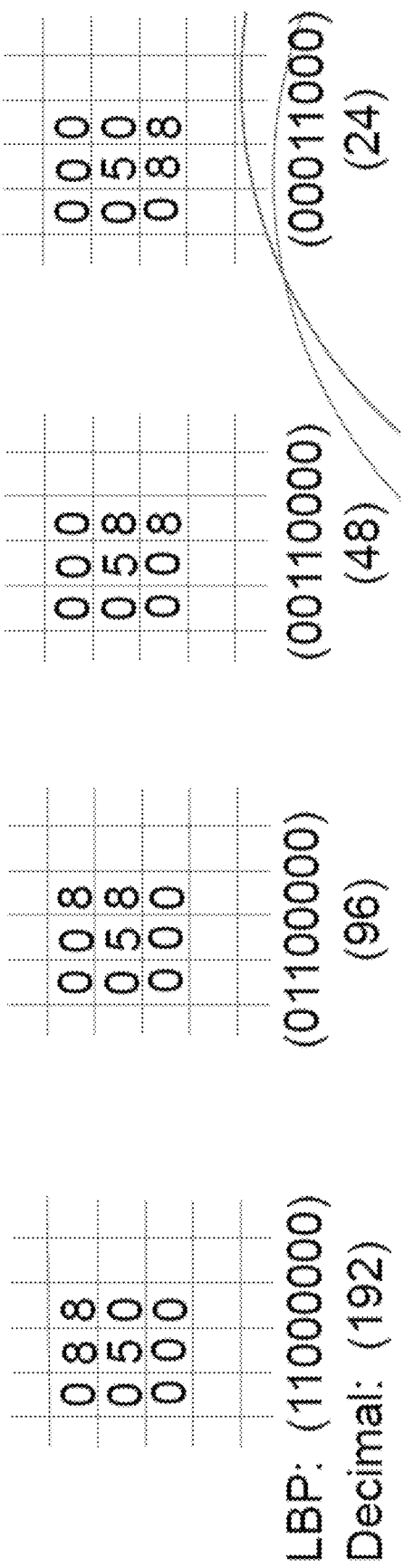
FIG. 7 is a schematic view of four local binary patterns that each have different orientations.
Figure 9D:
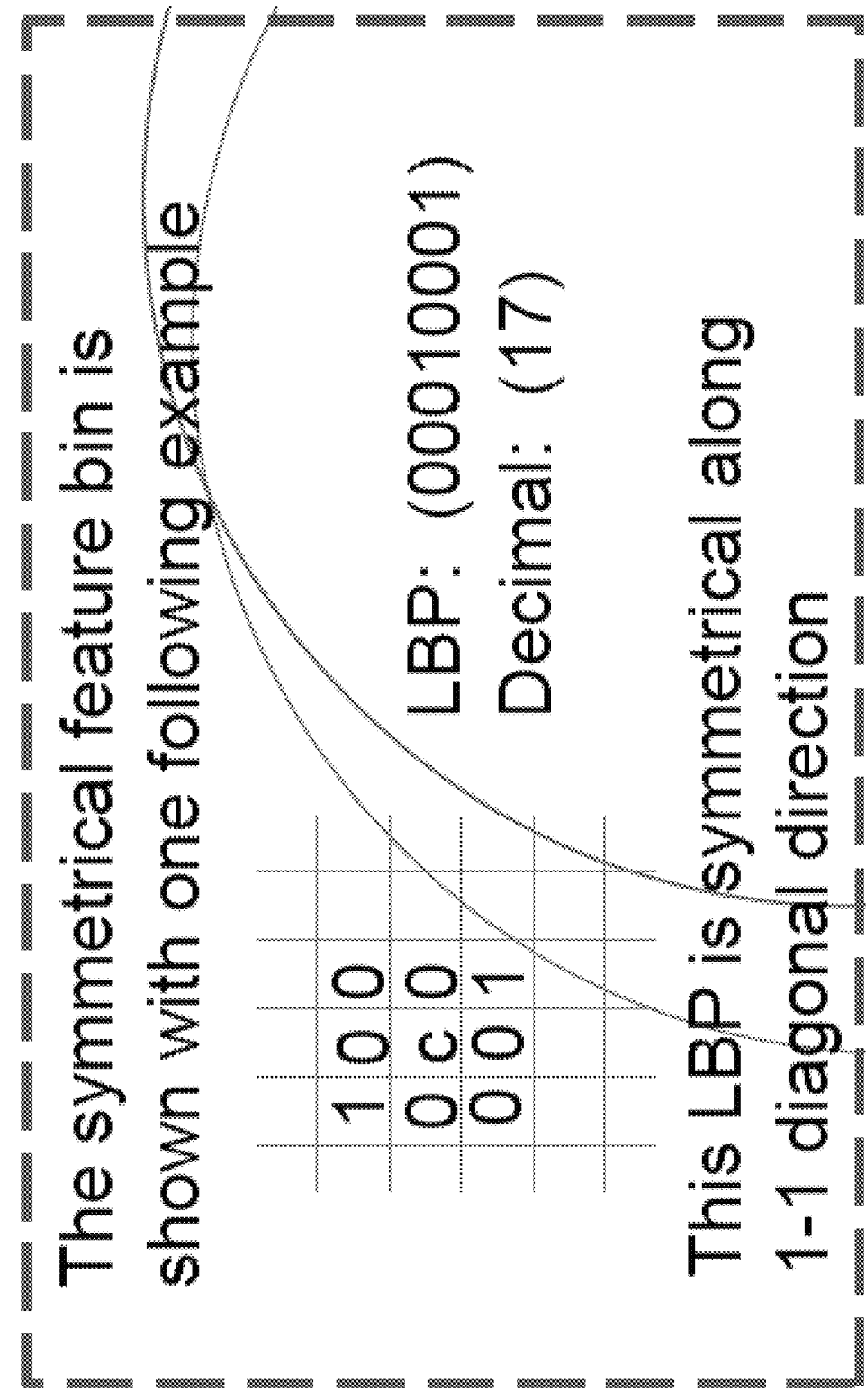
FIG. 9D is a schematic view of a symmetrical feature bin that is symmetrical along a diagonal direction.

Grouping all LBP with larger than 2 "1-0" or "0-1" transitions as one pattern (i.e., all in the same bin) reduces the ability to distinguish two signals because the high frequency presents their difference in case that they have similar low frequency components. Uniform LBP is not rotation-invariant by itself, as each rotation of the same LBP builds one pattern (FIG. 7). This may lead to miss-detection when the target and reference object have different orientations. As shown in FIG. 7, four different LBPs corresponding to the integers 192, 96, 48, and 24 each have the same pattern. That is, these four LBP patterns correspond to the same patch with four different orientations. Based on the definition of a uniform LBP, each will belong to different binary patterns (bins) because they have at most 2 "1-0" and/or "0-1" transitions.

Implementations described herein include a vision system that includes an object classifier for object classification that uses enhanced rotation invariant local binary pattern features. With enhanced rotation invariant local binary pattern features, the same 2-D local binary patterns of different orientations are grouped into a single bin (pattern). Based on this definition, the four patterns of FIG. 7 (i.e., the same object with different orientations) will instead be grouped into one binary pattern (bin) instead of four different patterns as with the uniform LBP.

With enhanced rotation invariant local binary patterns, when, for example, P=8 and R=1, a total of 256 LBP features will be grouped into 36 bins. Based on "1-0" and "0-1" transitions, these 36 bins may be further classified into nine uniform bins with at most two "1-0" or "0-1" transitions, three symmetrical bins with at least three and at most four "1-0" or "0-1" transitions, sixteen variable bins with at least three and at most four "1-0" or "0-1" transitions, seven fluctuating bins with at least five and at most six "1-0" or "0-1" transitions, and one wave bin with seven "1-0" or "0-1" transitions. Using this strategy, LBP features may be grouped with any values of P and R. For example, when P=16 and R=2, the 65,536 LBP features may be grouped the same way as described above.

FIGS. 8A-12 illustrate the 36 bins of the above example (i.e., P=8 and R=1). For example, FIGS. 8A-8I illustrate the nine uniform bins with at most two "1-0" or "0-1"-transitions (i.e., bins 1-9). FIGS. 9A-9C illustrate the three symmetrical feature bins with at least three and at most four "1-0" or "0-1" transitions (i.e., bins 10-12). FIG. 9D provides an additional example of a symmetrical feature bin associated with integer value 17 and LBP 0b00010001. Here, the LBP is symmetrical along the "1-1" diagonal direction. FIGS. 10A-10P illustrate the sixteen variable bins (i.e., bins 13-28) with at least three and at most four "1-0" or "0-1" transitions. FIGS. 11A-11G illustrate the seven fluctuating bins with at least five and at most six "1-0" or "0-1" transitions. FIG. 12 illustrates one wave bin (i.e., bin 36) with seven transitions.

The vehicular vision system may generate a histogram of LBPs by counting occurrences of defined LBP bins in localized portions of an image (e.g., a segment of an image frame) to perform object detection and classification. The vehicular vision system uses enhanced rotation invariant LBPs to provide a number (e.g., 36) of standalone feature bins to build a histogram for object classification with a length of 36 feature vectors for a single cell. The size of feature bins may be further reduced by grouping bins of high numbers of "1-0" or "0-1" transitions into one single bin, e.g., grouping seven fluctuating bins (FIGS. 11A-11G) and one wave bin (FIG. 12) into one bin. In this case, the length of the feature vectors for a single cell will reduce from 36 to 29.

The system may combine the enhanced rotation invariant LBP definition with other LBP definitions to build the histogram for object classification. For example, to improve the differentiating ability of ULBP, a single bin of all non-uniform LBP may be further divided into three symmetrical feature bins and one bin with remaining non-uniform LBP. This modification will build a length of 62 feature vectors for a single cell (58 uniform feature bins, three symmetrical feature bins, and one bin of the remaining non-uniform LBPs). The LBPs may be extracted from a segment of captured images (e.g., images captured by a fisheye lens camera, a rectified image, etc.) or from processed images such as an edge strength map to compensate for lighting differences between the target object and the training object.

Thus, the vehicle vision system may process image data using an object detection and/or classification model. The model may detect and/or classify objects in image data captured by one or more cameras. The model may use local binary patterns to detect and/or classify the objects. The model may group local binary patterns of different orientations into the same bin. The vision system may incorporate the rotation invariant local binary patterns with other machine learning algorithms, such as histogram of oriented gradients (HOG)+support vector machine (SVM), Channel Filters+AdaBoost, etc. The vision system may detect and/or classify objects such as other vehicles, pedestrians, road signs, and the like.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ™ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466;

7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, the vehicular vision system comprising:
   a camera disposed at a vehicle equipped with the vehicular vision system and viewing exterior of the vehicle, the camera capturing image data;
   wherein the camera comprises a CMOS imaging array, and wherein the CMOS imaging array comprises at least one million photosensors arranged in rows and columns;
   an electronic control unit (ECU) comprising electronic circuitry and associated software;
   wherein the electronic circuitry of the ECU comprises an image processor for processing image data captured by the camera to detect presence of objects viewed by the camera;
   wherein the vehicular vision system, based at least in part on processing at the ECU of image data captured by the camera, sorts local binary patterns into bins of a histogram, and wherein each local binary pattern represents in binary form image data of a portion of an object;
   wherein the vehicular vision system, via processing at the ECU of image data captured by the camera, detects the object at a first orientation relative to camera, and wherein a first local binary pattern represents in binary form a first portion of the image data that includes the detected object;
   wherein the vehicular vision system, via processing at the ECU of image data captured by the camera, detects the object at a second orientation relative to camera, and wherein a second local binary pattern represents in binary form a second portion of the image data that includes the detected object, wherein the second orientation is different from the first orientation and the second local binary pattern is different than the first local binary pattern;
   wherein the vehicular vision system groups the first local binary pattern and the second local binary pattern into the same bin of the histogram; and
   wherein the vehicular vision system classifies the detected object based at least in part on the same bin of the histogram.

2. The vehicular vision system of claim 1, wherein the same bin of the histogram comprises one selected from the group consisting of (i) a uniform bin, (ii) a symmetrical bin, (iii) a variable bin, (iv) a fluctuating bin and (v) a wave bin.

3. The vehicular vision system of claim 1, wherein the same bin of the histogram comprises a uniform bin, and wherein the uniform bin includes local binary patterns that include at most two transitions between zeros and ones.

4. The vehicular vision system of claim 1, wherein the same bin of the histogram comprises a symmetrical bin, and wherein the symmetrical bin includes local binary patterns that include at least three and at most four transitions between zeros and ones.

5. The vehicular vision system of claim 1, wherein the same bin of the histogram comprises a variable bin, and wherein the variable bin includes local binary patterns that include at least three and at most four transitions between zeros and ones.

6. The vehicular vision system of claim 1, wherein the same bin of the histogram comprises a fluctuating bin, and wherein the fluctuating bin includes local binary patterns that include at least five and at most six transitions between zeros and ones.

7. The vehicular vision system of claim 1, wherein the same bin of the histogram comprises a wave bin, and wherein the wave bin includes local binary patterns that include seven transitions between zeros and ones.

8. The vehicular vision system of claim 1, wherein a classification model generates the histogram of the local binary patterns using the bins of the histogram.

9. The vehicular vision system of claim 1, wherein the camera includes a fisheye lens.

10. The vehicular vision system of claim 1, wherein the vehicular vision system, responsive to the vehicular vision system classifying the object as a pedestrian, warns an occupant of the vehicle of the pedestrian.

11. The vehicular vision system of claim 1, wherein the vehicular vision system groups all local binary patterns into a bin of the histogram selected from the group consisting of (i) nine uniform bins, (ii) three symmetrical bins, (iii) sixteen variable bins, (iv) seven fluctuating bins, (v) and one wave bin.

12. A vehicular vision system, the vehicular vision system comprising:
   a camera disposed at a vehicle equipped with the vehicular vision system and viewing exterior of the vehicle, the camera capturing image data;
   wherein the camera comprises a CMOS imaging array, and wherein the CMOS imaging array comprises at least one million photosensors arranged in rows and columns;
   an electronic control unit (ECU) comprising electronic circuitry and associated software;
   wherein the electronic circuitry of the ECU comprises an image processor for processing image data captured by the camera to detect presence of objects viewed by the camera;
   wherein the vehicular vision system, based at least in part on processing at the ECU of image data captured by the camera, sorts local binary patterns into bins of a histogram, and wherein each local binary pattern represents in binary form image data of a portion of an object within the view of the camera;

wherein the vehicular vision system, via processing at the ECU of image data captured by the camera, detects the object at a first orientation relative to camera, and wherein a first local binary pattern represents in binary form a first portion of the image data that includes the detected object;

wherein the vehicular vision system, via processing at the ECU of image data captured by the camera, detects the object at a second orientation relative to camera, and wherein a second local binary pattern represents in binary form a second portion of the image data that includes the detected object, wherein the second orientation is different from the first orientation and the second local binary pattern is different than the first local binary pattern, and wherein the first local binary pattern has a different number of transitions between zeros and ones than the second local binary pattern;

wherein the vehicular vision system groups the first local binary pattern and the second local binary pattern into the same bin of the histogram; and wherein the vehicular vision system classifies the detected object based at least in part on the same bin of the histogram.

13. The vehicular vision system of claim 12, wherein the same bin of the histogram comprises one selected from the group consisting of (i) a uniform bin, (ii) a symmetrical bin, (iii) a variable bin, (iv) a fluctuating bin and (v) a wave bin.

14. The vehicular vision system of claim 12, wherein the same bin of the histogram comprises a uniform bin, and wherein the uniform bin includes local binary patterns that include at most two transitions between zeros and ones.

15. The vehicular vision system of claim 12, wherein the same bin of the histogram comprises a symmetrical bin, and wherein the symmetrical bin includes local binary patterns that include at least three and at most four transitions between zeros and ones.

16. The vehicular vision system of claim 12, wherein the same bin of the histogram comprises a variable bin, and wherein the variable bin includes local binary patterns that include at least three and at most four transitions between zeros and ones.

17. The vehicular vision system of claim 12, wherein the same bin of the histogram comprises a fluctuating bin, and wherein the fluctuating bin includes local binary patterns that include at least five and at most six transitions between zeros and ones.

18. The vehicular vision system of claim 12, wherein the same bin of the histogram comprises a wave bin, and wherein the wave bin includes local binary patterns that include seven transitions between zeros and ones.

19. A vehicular vision system, the vehicular vision system comprising:

a camera disposed at a vehicle equipped with the vehicular vision system and viewing exterior of the vehicle, the camera capturing image data;

wherein the camera comprises a CMOS imaging array, and wherein the CMOS imaging array comprises at least one million photosensors arranged in rows and columns;

an electronic control unit (ECU) comprising electronic circuitry and associated software;

wherein the electronic circuitry of the ECU comprises an image processor for processing image data captured by the camera to detect presence of objects viewed by the camera;

wherein the vehicular vision system, based at least in part on processing at the ECU of image data captured by the camera, sorts local binary patterns into bins of a histogram, and wherein each local binary pattern represents in binary form image data of a portion of an object within the view of the camera;

wherein the vehicular vision system, via processing at the ECU of image data captured by the camera, detects the object at a first orientation relative to camera, and wherein a first local binary pattern represents in binary form a first portion of the image data that includes the detected object;

wherein the vehicular vision system, via processing at the ECU of image data captured by the camera, detects the object at a second orientation relative to camera, and wherein a second local binary pattern represents in binary form a second portion of the image data that includes the detected object, wherein the second orientation is different from the first orientation and the second local binary pattern is different than the first local binary pattern, and wherein the first local binary pattern and the second local binary pattern each have greater than two transitions between zeros and ones;

wherein the vehicular vision system groups the first local binary pattern and the second local binary pattern into the same bin of the histogram; and wherein the vehicular vision system classifies the detected object based at least in part on the same bin of the histogram.

20. The vehicular vision system of claim 19, wherein the same bin of the histogram comprises one selected from the group consisting of (i) a uniform bin, (ii) a symmetrical bin, (iii) a variable bin, (iv) a fluctuating bin and (v) a wave bin.

21. The vehicular vision system of claim 19, wherein the vehicular vision system groups all local binary patterns into a bin of the histogram selected from the group consisting of (i) nine uniform bins, (ii) three symmetrical bins, (iii) sixteen variable bins, (iv) seven fluctuating bins, (v) and one wave bin.

* * * * *